United States Patent Office 3,453,364
Patented July 1, 1969

3,453,364
THERAPEUTIC INFUSION AND INJECTION COMPOSITION CONTAINING HYDROXY-ALKYL DEXTRAN
Per Gustaf Magnus Flodin, Perstorp, and Kirsti Annikki Granath, Bjorn Gustaf-Adolf Ingelman, and Christina Johansson, Uppsala, Sweden, assignors to Aktiebolaget Pharmacia, Uppsala, Sweden, a company of Sweden
No Drawing. Filed Aug. 12, 1964, Ser. No. 389,181
Claims priority, application Sweden, Sept. 2, 1963, 9,581/63
Int. Cl. A61k 27/00; C08b 19/08
U.S. Cl. 424—180    4 Claims

ABSTRACT OF THE DISCLOSURE

The invention pertains to aqueous solutions of hydroxyalkyl dextrans containing, on an average, from about 0.01 to 0.2 hydroxyalkyl group per anhydroglucopyranosidic unit, said hydroxyalkyl group containing from 2 to 5 carbon atoms and said dextrans presenting a reduced tendency towards formation of flakes when stored in the aqueous solution.

---

This invention generally relates to certain novel hydroxyalkyl dextran products. This invention also relates to therapeutic compositions comprising aqueous solutions containing these novel hydroxyalkyl dextrans. The invention also pertains to dosage units for infusion and injection purposes containing the novel hydroxyalkyl dextrans. The invention also relates to a method for preparing certain hydroxyalkyl dextrans.

THE STATE OF THE ART PRIOR TO THIS INVENTION

The use of dextran products for medical purposes is well-known, particularly dextran products having an average molecular weight (M.W.) below 200,000, and especially those within the range of from about 3,000 to 100,000. Even more particularly there may be mentioned dextran products having an average molecular weight of 75,000 (plus or minus 25,000) and 35,000 (plus or minus 15,000). Dextran is used medically in the form of aqueous solutions for purposes of infusion and injection. The concentration of such solutions is commonly within the range of from 3 to 15 percent, and particularly within the range of from 5 to 10 percent. In storing solutions of dextran for a long time in warm or hot places, and particularly under such conditions as to subject the solution to widely varying temperatures, particles of dextran tend to precipitate out in the solution, for example in the form of flakes. When this happens the dextran solution is usually considered unusable. In the following description this phenomenon of precipitation is referred to as "flake formation" or "flaking." As a result of "flake formation" large quantities of dextran solution have to be either rejected or reprocessed.

This flaking phenomenon is described in the U.S. Patent No. 3,006,814, which proposes a method for decreasing the tendency towards flake formation. This method involves adding certain low molecular weight substances, for example, polyethylene glycol, to the dextran solution. However, this method has proved insufficient with respect to storing dextran solutions under unfavorable conditions of temperature. Moreover, the amount of these additives necessary to prevent flake formation is frequently so great that the dextran solution is rendered unsatisfactory for medical purposes. (Reference is made to Patent 3,006,814 for further background information on raw dextran, hydrolyzed dextran, its clinical use, and the problems of "flaking" that are encountered with dextran solutions (e.g. column 1, lines 9–64).)

OBJECTS

It is therefore an object of this invention to overcome the aforesaid disadvantages associated with the preparation and storage of dextran and dextran solutions. It is an object of this invention to produce a substituted dextran solution which is essentially equivalent to pure dextran solutions from a medical point of view but which will have superior storage properties and less problems with flaking. These and other objects and advantages will be apparent after reading the following description and the claims.

THE PRESENT INVENTION

From one aspect, the present invention pertains to certain novel hydroxyalkyl dextrans which exhibit a reduced tendency towards forming flakes when stored in the form of aqueous solutions. The hydroxyalkyl dextrans of this invention are dextrans that have been substituted to a small degree with one or more hydroxyalkyl groups. While the degree of substitution is low, it is sufficient to reduce or eliminate flake formation in aqueous solutions, and yet not great enough to materially change their usefulness as ingredients of aqueous solutions for injection and infusion purposes.

More specifically it has been discovered that dextran subsituted to a low degree with hydroxyalkyl groups, each containing from 2 to 5 inclusive carbon atoms, can be stored in an aqueous solution for an almost unlimited period of time, even under conditions of temperature which would ordinarily be regarded as especially unfavorable because of risks of flake formation. Provided that the degree of substitution amounts to a relatively low value, our substituted dextrans will maintain, in a surprising manner, the property of the unsubstituted dextran of being eliminated from the body. The hydroxyalkyl substituted dextran of our invention also maintains the low toxicity of the unsubstituted dextran. By low-substituted dextran according to the broadest scope of the invention we mean dextran substituted by no more than 0.2 lower hydroxyalkyl groups per anhydroglucopyranosidic unit. In other words, the degree of substitution is such that on an average, less than every fifth unit of glucose of the dextran carries a substituent consisting of a lower hydroxyalkyl group. In order to attain any worthwhile antiflaking action it is usually required that there be a degree of substitution of at least 0.01, and preferably at least about 0.02 hydroxyalkyl group per anhydroglucopyranosidic unit. The degree of substitution generally need not exceed about 0.1. Our invention especially relates to products having a degree of substitution within the range of from about 0.01 to about 0.2 and more especially within the range of from about 0.02 to about 0.1, the most satisfactory results being obtained within the range of from about 0.02 to about 0.08. In the range from about 0.1 to about 0.2 a certain retardation of the breakdown and the elimination can be observed, so that a substitution degree lower than about 0.1 is preferably chosen.

So far as is known, such low-substituted dextran products have not been previously described in the literature.

This invention also encompasses the method for producing these novel products. The method comprises reacting dextran with a member selected from the group consisting of (a) substances of the formula X—R, wherein X is a member selected from the group consisting of chloro and bromo and R is hydroxyalkyl, containing from 2 to 5 inclusive carbon atoms, and (b) epoxy compounds obtainable by splitting off hydrogen halide from substances having the formula X—R, as defined above, said reaction being carried out in the presence of an alkaline reacting substance to thereby produce the corresponding hydroxyalkyl-substituted dextran having a degree of substitution within the range of from about 0.01 to about 0.2 hydroxyalkyl group per anhydroglucopyranosidic unit. As a result of this method, every molecule of dextran will carry a number of hydroxyalkyl groups which are connected to the glucose units of the dextran molecule in an ether-like manner. The number of these substituents per molecule will, of course, be dependent on the degree of substitution and on the number of glucose units per molecule.

The reaction is preferably carried out in soluton, and preferably in aqueous solution in the presence of an alkaline reacting substance. The alkaline reacting substances that we have usually used are the alkali metal hydroxides such as sodium hydroxide and potassium hydroxide. In this connection, the alkaline reacting substance acts as a catalyst. If the lower hydroxyalkyl group or groups are to be introduced by the aid of a substance of the formula X—R (as defined above), the alkaline substance will also react as an acceptor for the hydrogen halide librated in the reaction. If the lower hydroxyalkyl group or groups are introduced into the dextran by the aid of epoxy compounds obtainable by splitting off hydrogen halide (from a halogen atom and a hydrogen atom in a hydroxyl group) from substances having the formula X—R, the alkaline reacting substance will only act as a catalyst for the addition of the epoxy compound to the hydroxyl groups of the dextran with formation of an ether bridge and a hydroxyl group from the oxygen group. In this connection, 1,2-epoxy compounds are preferably used. The simplest way of carrying the invention into practice is therefore as a rule to use such a compound directly.

For practical reasons, it is generally suitable to introduce only one kind of hydroxyalkyl group into the dextran. However, two or more different kinds of hydroxyalkyls may be introduced to the desired substitution degree, that is in the range of from about 0.01 to about 0.2 group per anhydropyranosidic unit. For example, both a 2-hydroxyethyl and a 2-hydroxypropyl may be introduced in different amounts, either by simultaneously treating the dextran with two different substances having general formula X—R (as defined above) or with epoxy compounds obtainable by splitting off hydrogen halide from compounds of this formula or with these substances separately in arbitrary sequence.

As a substituent R contaning one or more hydroxy groups, there may, for example, be mentioned the following:

2-hydroxyethyl; 2-hydroxypropyl; 2,3-dihydroxypropyl; 2-hydroxybutyl; and 2-hydroxypentyl.

As examples of compounds of the formula X—R and epoxy compounds obtainable by splitting off hydrogen halide from compounds of this formula, which can be used for the preparation of the novel low substituted dextrans there may be mentioned the following:

Ethyl oxide;
ethylene chlorohydrin;
ethylene bromohydrin;
1,2-epoxy propane;
1-chloro-2-propanol;
1-chloro-2,3-propandiol;
1,2-epoxy-3-propanol;
1-bromo-2,3-propandiol;
1,2-epoxy butane;
1-chloro-2-butanol;
2,3-epoxy butane; and
2,3-epoxy pentane.

Among the novel dextran products encompassed by this invention there may be mentioned for example low substituted 2-hydroxypropyl dextran; 2,3-dihydroxypropyl dextran; and 2-hydroxyethyl dextran and 2-hydroxybutyl dextran; and such compounds exhibit particularly excellent decreased flake formation characteristics, while still retaining the property of being eliminated from the body. Moreover, the compounds have exhibited extra-ordinarily low toxicity. Especially preferable compounds are the low substituted 2-hydroxypropyl dextrans.

For the manufacture of dextran for therapeutical purposes, so-called raw dextran or native dextran of relatively high molecular weight is commonly used as a starting material. This dextran is then subjected to depolymerization to suitable molecular sizes, usually catalytically in the presence of a mineral acid, for example hydrochloric acid. According to the present invention, the hydroxyalkyls can be introduced into the raw dextran, whereafter the substituted raw dextran is subjected to the desired amount of depolymerization. The conditions prevailing in the depolymerization process are commonly of no or only minor influence upon the degree of substitution. Of course, it is also possible to introduce the hydroxyalkyl groups into a dextran which has already been depolymerized into the molecular size range desired for final use or into a dextran which has obtained this molecular size range desired by special enzymatic methods or bacteriological methods.

The invention also contemplates therapeutic compositions consisting of aqueous solutions containing the aforementioned novel low substituted hydroxyalkyl dextrans. Such solutions, which are used as infusion and injection fluids are prepared by dissolving the novel substituted dextrans in water free from pyrogenes. Optionally, after additions of usual low-molecular additives such as glucose and/or salts, for example sodium chloride, the aqueous solution can then be transformed into a form suitable for parenteral administration. The concentration of the low substituted hydroxyalkyl dextrans of the solution is commonly within the range of from about 3 to 15 percent. The solutions are usually filled in infusion bottles. Suitable dosage units for infusion and injection purposes are in the range of from 100 to 1,000 ml.

(In this specification and in the claims, the expression "dextran" is also intended to encompass dextran products presenting, owing to the process of manufacture, a reducing end group per molecule as well as such dextrans which as a result of the process of manufacture have had their reducing end group changed, for example by oxidation or hydrogenation or by conversion into a glycoside, without the properties which are of importance for the therapeutic use of the dextran having been lost.)

Examples

The following examples are illustrative of some preferred embodiments of the present invention. In order to characterize the starting, intermediate and final dextran products that were used in the experiments which are summarized in the examples below, the designation "LV" has been frequently employed. LV stands for "limiting viscosity" or "/η/" (equivalent to intrinsic viscosity), which is a function of average molecular weight. The average molecular weight (M.W.) may be determined by light scattering measurements.

Example I.—2-hydroxypropyl dextran of varying substitution degree (A) In a flask provided with a stirrer were placed 200 g. of 17 percent solution of raw dextran in water (LV=1.2) (34 g. of dextran). To this solution were added 5 g. of sodium hydroxide dissolved in 10 ml. of water as a catalyst. From a dropping funnel, were added 2 ml. of 1,2-epoxypropane (boiling point 34.2° C., molecular weight=58.1). The reaction was permitted to take place for 24 hours at room temperature. The reaction mixture was neutralized with hydrochloric acid to neutral reaction, and ethyl alcohol was then added thereto in an amount of eight times the solution volume so as to complete precipitation of the substituted dextran. The latter was dried under vacuum at 50° C. The yield of 2-hydroxypropyl dextran was 32 g. The degree of substitution was 0.11 and the limiting viscosity number was the same as that of the starting substance.

25 g. of the 2-hydroxypropyl substituted raw dextran were dissolved in 250 ml. of water in a round flask provided with a stirrer. The solution was heated to 80° C. on a water bath, whereupon hydrochloric acid was added, until the reaction mixture became 0.14 molar. The time of hydrolysis was 95 min. at 80° C. After the hydrolyzing process, the mixture was neutralized with sodium hydroxide and precipitated three times with ethyl alcohol. The hydrolyzed product was dried under vacuum at 65° C. The product thus obtained had the limiting viscosity number of 0.28, and the degree of substitution was 0.11 group per unit of glucose.

(B) In a flask provided with a stirrer were placed 500 g. of a 20 percent solution of raw dextran (limiting viscosity number 1.3) in water and a solution of 5 g. of sodium hydroxide in 10 ml. of water. From a dropping funnel were added 2 ml. of 1,2-epoxypropane. The remainder of the reaction was thereafter carried out in accordance with the procedure set forth under paragraph A. The yield of 2-hydroxypropyl dextran was 85 g.

The hydroxypropyl dextran obtained was hydrolyzed in an aqueous 0.14 molar solution of hydrogen chloride at 80° C. for 150 min. The depolymerized substituted dextran had a limiting viscosity number of 0.15, and the degree of substitution was 0.04.

(C) In a 5 liter three-necked reaction vessel provided with a stirrer and a dropping funnel were placed 3 liters of a 20 percent solution of dextran having the limiting viscosity number of 0.26 in water and 15 g. of sodium hydroxide dissolved in 30 ml. of water. From a dropping funnel were added 8 ml. of 1,2-epoxypropane. The reaction was permitted to take place 24 hours at room temperature, whereupon neutralization was carried out with hydrochloric acid. The substance was precipitated with ethyl alcohol and reprecipitated three times. It was dried at 60° C. in a vacuum drying oven. The yield of 2-hydroxypropyl dextran was 600 g., the degree of substitution 0.013 and the limiting viscosity number was 0.26.

(D) This experiment was carried out with the same starting dextran as above and analogously to what has been set forth under C except that the amount of 1,2-epoxypropane was 150 ml. The yield of 2-hydroxypropyl dextran was 580 g., the degree of substitution 0.19 and the limiting viscosity number 0.28.

(E) In a 2 liter reaction vessel provided with a stirrer and dropping funnel, were placed 1000 g. of a 15 percent solution of dextran (LV=0.27) in water. To the solution were added 5 g. of sodium hydroxide dissolved in 10 ml. of water as a catalyst. From a dropping funnel were added a mixture of 1.6 ml. of 1,2-epoxy propane and 1.6 ml. of water. The reaction was permitted to take place for 4 hours at 40° C. Then the reaction mixture was cooled to room temperature and neutralized with hydrochloric acid to neutral reaction. Ethanol was then added thereto in an amount of 8 times the volume of solution to complete precipitation of the substituted dextran. The substance was reprecipitated twice and dried in a vacuum oven at 60° C. The yield of 2-hydroxypropyl dextran was 123 g. The degree of substitution was 0.02.

Example II.—2,3-dihydroxypropyl dextran (A) In a flask with a stirrer were placed 200 g. of a 20 percent solution of raw dextran (limiting viscosity number=1.2) in water. To the solution obtained were added 5 g. of sodium hydroxide dissolved in 10 ml. of water as a catalyst. From a dropping funnel were added 10 ml. of 1,2-epoxy-3-propanol. The reaction was permitted to proceed for 24 hours at room temperature. The reaction mixture was neutralized with hydrochloric acid to neutral reaction and precipitated with ethyl alcohol. The substitution product precipitated was purified by three precipitations from ethyl alcohol. The substance was dried in a vacuum drying oven at 50° C. The yield of 2,3-dihydroxypropyl dextran was 37 g.

25 g. of the 2,3-dihydroxypropyl dextran were dissolved in 250 ml. of water, whereupon the solution was heated to 80° C. To the hot solution was added hydrochloric acid in a sufficient amount to render the dextran solution 0.14 molar with respect to the acid. The time of hydrolysis was 140 min. After neutralization with sodium hydroxide, reprecipitation three times with ethanol and drying in a vacuum drying oven at 50° C., there were obtained 21 g. of a 2,3-dihydroxypropyl dextran having the degree of substitution 0.15. The limiting viscosity number of the hydrolyzed product was 0.18.

(B) In a 5 liter three-necked reaction vessel provided with a stirrer and dropping funnel were placed 3 liters of an aqueous 20 percent solution of dextran having a limiting viscosity number of 0.26 and as a catalyst 15 g. of sodium hydroxide dissolved in 30 ml. of water. From a dropping funnel were added 12 ml. of 1,2-epoxy-3-propanol. The reaction was permitted to proceed for 24 hours at room temperature, whereupon the mixture was neutralized with hydrochloric acid. The substance was precipitated with ethyl alcohol and reprecipitated three times from ethyl alcohol, whereupon it was dried in a vacuum drying oven at 60° C. The yield of 2,3-dihydroxypropyl dextran was 570 g. the substitution degree 0.033 and the limiting viscosity number 0.27.

(C) To 200 g. of a 20 percent solution of dextran having the limiting viscosity number 0.26 in water were added 6 g. of sodium hydroxide, and the mixture was caused to react, in a manner similar to what has been set forth under Example II–B, with 2 ml. of 1-chloro-2,3-propandiol. The reprecipitated product had the substitution degree 0.07 and the same limiting viscosity number as the starting substance.

(D) In a 2-liter reaction vessel provided with a stirrer and dropping funnel, were placed 1000 g. of a 15 percent solution of dextran (LV=0.27) in water. To the solution were added 5 g. of sodium hydroxide dissolved in 10 ml. of water as a catalyst. From a dropping funnel was added a mixture of 1.6 ml. of 3-chloro-1,2-propandiol and 1.6 ml. of water. The reaction was permitted to take place for 4 hours at 70° C. The reaction mixture was neutralized with hydrochloric acid at room temperature and then precipitated with ethanol in an amount of 8 times the volume of solution. The product was reprecipitated twice and dried in a vacuum oven at 60° C. The yield of 2,3-dihydroxypropyl dextran was 129 g. The degree of substitution was 0.02.

Example III.—2-hydroxybutyl dextran (A) In a flask provided with a stirrer were placed 300 g. of a 20 percent solution of dextran (LV=0.70) in water. To this solution were added 5 g. of sodium hydroxide dissolved in 10 ml. of water and then 2 ml. of 1,2-epoxy butane from a burette. The reaction was permitted to proceed for 24 hours at room temperature. After neutralization with hydrochloric acid and working up as set forth in Example I there were obtained 57 g. of 2-hydroxybutyl dextran having a substitution degree of 0.07.

40 g. of this 2-hydroxybutyl dextran were dissolved in water to about a 10 percent solution. To the solution was added hydrochloric acid, until it became 0.14 molar with respect to the acid. The hydrolyzing process was carried out at 80° C. for 105 minutes. After working up as set forth in Example I, there were obtained 36 g. of depolymerized 2-hydroxybutyl dextran having the substitution degree 0.07 and the limiting viscosity number 0.20.

(B) The reaction was caused to take place in a 5 liter three-necked reaction flask in a manner similar to that which has been set forth in Example II–B except that 150 ml. of 1,2-epoxy butane were added from a dropping funnel. The product was worked up and dried in a similar manner to that which has been given in Example II–B and the yield of 2-hydroxybutyl dextran was 587 g.

The degree of substitution was 0.15 and the limiting viscosity number 0.27.

Example IV.—2-hydroxyethyl dextran (A) In a flask provided with a stirrer, were placed 300 g. of a 20 percent dextran solution (LV=0.18) in water and 5 g. of sodium hydroxide dissolved in 10 ml. of water. 3 ml. of ethylene chlorohydrin were added to the solution obtained, whereupon the reaction was caused to take place for 24 hours at room temperature. After working up as set forth in Example I, 60 g. of 2-hydroxyethyl dextran having a substitution degree of 0.09 and a limiting viscosity number of 0.19 were obtained.

(B) In a 5 liter round flask provided with a stirrer and dropping funnel were placed 3000/g. of a 20 percent solution of dextran (LV=0.26) in water. 15 g. of sodium hydroxide dissolved in 30 ml. of water ware added as a catalyst. From a dropping funnel were added 12 ml. of ethylene chlorohydrin. The reaction was permitted to take place for 24 hours at room temperature. The reaction mixture was then neutralized with hydrochloric acid and precipitated with ethanol in an amount of 8 times the volume of solution. The product was reprecipitated twice and dried in a vacuum oven at 60° C. The yield of 2-hydroxyethyl dextran was 565 g. The degree of substitution was 0.05 and the limiting viscosity number was 0.26.

The products synthesized according to Examples I to IV were tested for flake formation. For this purpose 100 ml. of a 20 percent solution of each test substance in water were prepared. The solutions were filtered, placed in 50 ml. ampoule bottles, and autoclaved at 120° C. for 20 min. As a control were used two 20 percent solutions of unsubstituted clinical dextrans having the limiting viscosity number 0.26 and 0.19 respectively. The bottles were then stored at +50° C. during the nights and at +4° C. during the days and examined at certain intervals of time. The solutions of the low substituted dextran products prepared according to the present invention did not present any flake formation even after storing them for a long time under these extremely unfavorable conditions, whereas the samples of the unsubstituted substance developed flakes after 3 weeks, for example, and a very pronounced formation of flakes after 10 weeks, for example. In the table below the results from such a series of tests are given, the changes of temperature being those as set forth above. In the table the sign + indicates formation of some flakes and the sign +++ indicates a very heavy formation of flakes and the sign — no formation of flakes.

TABLE

| Substance | LV | Substitution degree | After 3 weeks | After 10 weeks |
|---|---|---|---|---|
| 2-hydroxypropyl dextran | 0.26 | 0.013 | — | — |
|  | 0.28 | 0.19 | — | — |
| 2,3-dihydroxypropyl dextran | 0.27 | 0.033 | — | — |
| 2-hydroxybutyl dextran | 0.27 | 0.15 | — | — |
| 2-hydroxyethyl dextran | 0.19 | 0.09 | — | — |
| Unsubstituted dextran | 0.26 | 0 | + | +++ |
| Do | 0.19 | 0 | + | +++ |

Example V

From dextran substituted with 2-hydroxypropyl groups to a substitution degree of about 0.08 and having an average molecular weight of about 40,000 and sodium chloride, was prepared a solution in water void of pyrogens at about 80° C., said solution containing 10 g. of the substituted dextran and 0.9 g. of sodium chloride per 100 ml. The solution was filtered and then placed in 500 ml. bottles, which were closed and sterilized by treatment in an autoclave at 110° C. for 45 min. Bottles containing this solution could be stored for an apparently unlimited period of time under widely varying conditions of temperature, without flakes appearing in the solution.

Example VI

From dextran substituted with 2-hydroxypropyl groups to a substitution degree of about 0.05, having an average molecular weight of about 70,000 and sodium chloride, was prepared a solution in water void of pyrogens at about 80° C., said solution containing 6 g. of the substituted dextran and 0.9 g. of sodium chloride per 100 ml. After filtration, tapping in bottles, closing and sterilization, it was found that the solution could be stored for a long period of time under even very unfavorable conditions of temperature without the formation of flakes taking place.

Example VII

From dextran substituted with 2-hydroxypropyl groups to a degree of substitution of about 0.03, having an average molecular weight of about 40,000 and glucose, was prepared a solution in water void of pyrogens at about 90° C., said solution containing 15 g. of the substituted dextran and 5 g. of glucose per 100 ml. The solution was filtered and then placed in 300 ml. bottles, which were closed and sterilized by treatment in an autoclave at 100° C.

Example VIII

From dextran substituted with 2-hydroxypropyl groups to a degree of substitution of about 0.02, having an average molecular weight of about 70,000 and glucose, was prepared a solution in water void of pyrogens at about 80° C., said solution containing 6 g. of the substituted dextran and 5 g. of glucose per 100 ml. The solution was filtered and tapped in 1000 ml. bottles, which were closed and sterilized by autoclaving.

Example IX

From dextran substituted with 2,3-dihydroxypropyl groups to a substitution degree of about 0.03, having an average molecular weight of about 75,000 and sodium chloride, was prepared a solution in water void of pyrogens at about 95° C., said solution containing 5 g. of the substituted dextran and 0.9 g. of sodium chloride per 100 ml. The solution was filtered and placed in bottles, which were closed and sterilized.

Example X

From dextran substituted with 2-hydroxyethyl groups to a substitution degree of about 0.05, having an average molecular weight of about 75,000 and sodium chloride, was prepared a solution in water void of pyrogens at about 90° C., said solution containing 6 g. of the substituted dextran and 0.9 g. of sodium chloride per 100 ml. The solution was filtered and then placed in bottles, which were closed and sterilized.

Example XI

From dextran substituted with 2-hydroxybutyl groups to a substitution degree of about 0.07, having an average molecular weight of about 40,000 and sodium chloride, was prepared a solution in water void of pyrogens at about 80° C., said solution containing 8 g. of the substituted dextran and 0.85 g. of the sodium chloride per 100 ml. The solution was filtered and placed in bottles, which were closed and sterilized.

It was found that the bottles of solution prepared in accordance with Examples VII to XI could be stored for a very long period of time under widely varying conditions of temperature without flakes appearing in the solution.

What we claim is:

1. A therapeutic composition for infusion and injection purposes, consisting essentially of a pyrogen-free aqueous 3–15 percent solution of hydroxylalkyl dextran that contains, on an average, from about 0.01 to about 0.1 hydroxylalkyl group per anhydroglucopyranosidic unit, said hydroxylalkyl group containing from 2 to 5 inclusive carbon atoms and said hydroxylalkyl dextran having an average molecular weight within the range of from about 3,000 to about 100,000.

2. A therapeutic composition as claimed in claim 1, wherein the average molecular weight is within the range of from 50,000 to 100,000.

3. A therapeutic composition as claimed in claim 1, wherein the average molecular weight is within the range of from 20,000 to 50,000.

4. A dosage unit for infusion and injection purposes consisting of from 100 to 1,000 ml. of a pyrogen-free aqueous solution of from 3 to 15 percent by weight of hydroxyalkyl dextran that contains, on an average, from about 0.01 to 0.1 hydroxyalkyl group per anhydroglucopyranosidic unit, said hydroxylalkyl group containing from 2 to 5 inclusive carbon atoms and said hydroxyalkyl dextran having an average molecular weight in the range of from 3,000 to 100,000.

References Cited

UNITED STATES PATENTS 2,749,277   6/1965   Toulmin _____ 167—92

ALBERT T. MEYERS, *Primary Examiner.*

D. R. MAHANAND, *Assistant Examiner.*

U.S. Cl. X.R.

260—209, 233.3